(12) United States Patent
Xu (10) Patent No.: US 8,265,016 B2
(45) Date of Patent: Sep. 11, 2012

(54) SYSTEMS AND METHODS FOR REDUCING THE POWER USED TO TRANSMIT CHANNEL QUALITY INFORMATION (CQI) DURING PERSISTENT SCHEDULING

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1280 days.

(21) Appl. No.: 12/013,396

(22) Filed: Jan. 11, 2008

(65) Prior Publication Data

US 2009/0181712 A1 Jul. 16, 2009

(51) Int. Cl.
*H04W 4/00* (2009.01)
(52) U.S. Cl. ............... 370/329; 370/318; 370/395.4; 455/450; 455/522; 713/320
(58) Field of Classification Search ............ 455/343.4, 455/13.4, 67.13, 127.1–127.5, 135, 412.1, 455/418, 445, 450, 447, 574, 522, 561; 370/229, 370/230, 318, 320, 329, 352, 311, 328, 343; 370/395.4; 375/220, 146, 260; 713/320; 341/51
See application file for complete search history.

(56) References Cited

U.S. PATENT DOCUMENTS

| 2005/0191965 | A1* | 9/2005 | Yu et al. ............... 455/67.16 |
| 2007/0087772 | A1* | 4/2007 | Yi et al. ............... 455/522 |
| 2007/0189199 | A1* | 8/2007 | Nishio ............... 370/328 |
| 2008/0045272 | A1* | 2/2008 | Wang et al. ............... 455/561 |
| 2008/0232449 | A1* | 9/2008 | Khan et al. ............... 375/220 |
| 2008/0310540 | A1* | 12/2008 | Tiirola et al. ............... 375/267 |
| 2008/0311919 | A1* | 12/2008 | Whinnett et al. ............... 455/447 |
| 2009/0033524 | A1* | 2/2009 | Tiirola et al. ............... 341/51 |

FOREIGN PATENT DOCUMENTS

WO 2007065272 6/2007

OTHER PUBLICATIONS

R1-073314, Nortel, "MCS Selection for LTE," Aug. 2007.
R2-071292, Ericsson, "Scheduling optimizations—way forward," Mar. 2007.
R1-072590, Panasonic, Mitsubishi Electric, Philips, NTT DoCoMo, Huawei, "Proposed way forward for CQI Feedback Control and Content in E-UTRA," May 2007.
R1-073618, Panasonic, Texas Instruments, "Usage of Cyclic Shifts and block-wise spreading codes for Uplink ACK/NACK," Aug. 2007.
R1-073571, Samsung, "PUCH Transmission without Data in E-UTRA," Aug. 2007.
R1-073705, NTT DoCoMo, Fujitsu, Mitsubishi Electric, "Persistent Scheduling in E-UTRA," Aug. 2007.
R1-074287, NTT DoCoMo, "Multiplexing Schemes for UL Control Signals," Oct. 2007.
R1-072438, NTT DoCoMo, Fujitsu, NEC, Toshiba corporation, "CDMA-Based Control Signaling Multiplexing in E-UTRA Uplink," May 2007.

* cited by examiner

*Primary Examiner* — Shaima Q Aminzay
(74) *Attorney, Agent, or Firm* — Austin Rapp & Hardman (57) ABSTRACT

A method for instructing a mobile node to reduce the power used to transmit channel quality information is described. A scheduling mode of a mobile node is determined. An uplink control channel in a first format is allocated to the mobile node if the mobile node is in a first scheduling mode. The number of bits to use to insert channel quality information (CQI) on the uplink control channel is provided. The mobile node is instructed to reduce the power used to transmit CQI by a power reduction amount if the mobile node is in the first scheduling mode.

21 Claims, 11 Drawing Sheets

SYSTEMS AND METHODS FOR REDUCING THE POWER USED TO TRANSMIT CHANNEL QUALITY INFORMATION (CQI) DURING PERSISTENT SCHEDULING

TECHNICAL FIELD

The present disclosure relates generally to communications and wireless communications systems. More specifically, the present disclosure relates to systems and methods for reducing the power used to transmit channel quality information (CQI) during persistent scheduling.

BACKGROUND

The 3rd Generation Partnership Project, also referred to as "3GPP," is a collaboration agreement that aims to define globally applicable technical specifications and technical reports for 3rd Generation Systems. 3GPP Long Term Evolution (LTE) is the name given to a project to improve the Universal Mobile Telecommunications System (UMTS) mobile phone or device standard. The 3GPP LTE may define specifications for the next generation of mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE (i.e., E-UTRA and E-UTRAN) terminology, a base station is called an "Evolved NodeB" (eNB) and a mobile terminal or device is called "user equipment" (UE).

In 3GPP LTE, the eNB regularly transmits a downlink reference symbol (DLRS) that is used by the UEs for channel measurement, such as signal-to-interference ratio (SINR), which may be represented by channel quality information (CQI). Each UE regularly transmits CQI back to the eNB to enable the eNB to perform resource scheduling. Resource scheduling means the eNB allocates modulation schemes, coding rates and subcarrier frequencies to the UEs in order to optimize the downlink and uplink transmissions for each UE.

The data transmitted over a wireless network may be categorized as either non-real-time (NRT) data or real-time (RT) data. Examples of NRT data include data transmitted during web browsing by a UE or text-messaging to a UE, while an example of RT data is voice communication between UEs. Resource scheduling for NRT data is dynamically scheduled by the eNB to each UE at each transmission time interval (TTI). During dynamic scheduling, the UE regularly transmits CQI back to the eNB.

However, in 3GPP LTE the UEs also transmit and receive RT data, specifically voice data which may be carried as Voice over Internet Protocol (VoIP) transmissions. A VoIP session has periodic small data packets at fixed intervals and periodic silence indication (SID) packets at fixed intervals. Unlike NRT data transmission, VoIP transmission is handled using persistent scheduling. In contrast to dynamic scheduling, in persistent scheduling when a UE's downlink reception is enabled, if the UE cannot find its resource allocation (such as modulation and coding schemes (MCS)), a downlink transmission according to a predefined resource allocation is assumed.

VoIP transmission and its associated persistent method of resource allocation present special issues regarding the transmission of CQI by the UEs through an uplink control channel. As such, benefits may be realized by providing systems and methods for reducing the power used to transmit CQI during persistent scheduling.

SUMMARY OF THE INVENTION

A method for instructing a user equipment (UE) to reduce the power used to transmit channel quality information is described. A scheduling mode of a user equipment (UE) is determined. An uplink control channel in a first format is allocated to the UE if the UE is in a first scheduling mode. The number of bits to use to insert channel quality information (CQI) on the uplink control channel is provided. The UE is instructed to reduce the power used to transmit CQI by a power reduction amount if the UE is in the first scheduling mode.

In one configuration, the uplink control channel is a Physical Uplink Control Channel (PUCCH). The uplink control channel in the first format may carry two bits of information. The CQI may be two bits.

In one example, the number of bits is provided by a radio resource control (RRC) message via RRC signaling. The UE may be instructed to reduce the power used to transmit CQI by an RRC message via RRC signaling. The first scheduling mode may be a persistent scheduling mode.

The UE may be instructed to discontinue the reduction of power if the scheduling mode changes. The power reduction amount may be a fixed amount. The method described above may be implemented by an evolved NodeB (eNB).

A method for reducing the power to transmit channel quality information is also described. Resource allocations for an uplink control channel in a first format may be received. Channel quality information (CQI) may be inserted into the uplink control channel using a certain number of bits in accordance with the first format. The power used to transmit CQI may be reduced by a power reduction amount on the uplink control channel. The CQI may be transmitted on the uplink control channel using power that has been reduced by the power reduction amount.

The uplink control channel may be a Physical Uplink Control Channel (PUCCH). The uplink control channel in the first format may carry two bits of information. The CQI may be two bits. The power reduction amount may be a fixed amount. The reduction of transmission power for CQI may be suspended if there is data or other control signaling to be transmitted in the same subframe. The method described above may be implemented by a UE.

A eNB that is configured to instruct a UE to reduce the power used to transmit channel quality information is also described. The eNB includes a processor and memory in electronic communication with the processor. Instructions are stored in the memory. The instructions are executable to determine a scheduling mode of a UE, and allocate an uplink control channel in a first format to the UE if the UE is in a first scheduling mode. The instructions are also executable to provide the number of bits to use to insert channel quality information (CQI) on the uplink control channel, and instruct the UE to reduce the power used to transmit CQI by a power reduction amount if the UE is in the first scheduling mode.

A computer-readable medium is also described. The computer-readable medium includes executable instructions for determining a scheduling mode of a UE, and allocating an uplink control channel in a first format to the UE if the UE is in a first scheduling mode. The instructions are executable for providing the number of bits to use to insert channel quality information (CQI) on the uplink control channel, and instructing the UE to reduce the power used to transmit CQI by a power reduction amount if the UE is in the first scheduling mode.

A communications device that is configured to reduce the power to transmit channel quality information is also described. The communications device includes a processor and memory in electronic communication with the processor. Instructions are stored in the memory. The instructions are executable to receive resource allocations for an uplink control channel in a first format and insert channel quality information (CQI) into the uplink control channel using a certain number of bits in accordance with the first format. The instructions are also executable to reduce the power used to transmit CQI by a power reduction amount on the uplink control channel and transmit CQI on the uplink control channel using power that has been reduced by the power reduction amount.

DETAILED DESCRIPTION

The Third Generation Partnership Project (3GPP) includes a project known as Long Term Evolution (LTE) which strives to improve the Universal Mobile Telecommunication System (UMTS) mobile phone standard. Systems implementing these LTE improvements (hereafter, "LTE systems") may experience improved efficiency, lower costs, improved services, new spectrum opportunities, improved integration with other standards, etc. Communication applications, such as Voice over Internet Protocol (VoIP) may be implemented in LTE systems.

LTE systems may use dynamic scheduling and persistent scheduling to schedule and allocate resources to UEs. Dynamic scheduling of resources may be implemented for non-real-time (NRT) data transmissions (e.g., data transmitted during web browsing, text-messaging, etc.) Persistent scheduling of resources may be implemented for real-time (RT) data transmissions (e.g., voice communications, VoIP, etc.) If a UE is in a dynamic scheduling mode, resources may be allocated for each individual packet of NRT data that is to be transmitted to or received from the UE. One drawback of dynamic scheduling is the large amount of signaling. For example, in dynamic scheduling, almost 30 levels of modulation and coding schemes (MCS) may be considered for each request of resources sent from the UE.

In order to reduce the amount of signaling, persistent scheduling may be used. If the UE is in a persistent scheduling mode, a sequence of resources as well as a fixed modulation and coding scheme (MCS) may be allocated to the UE at the beginning of an active period of RT data transmissions (e.g., the time period the UE is transmitting voice packets) or at the beginning of an inactive period of RT data transmissions (e.g., the time period the UE is receiving silence identification (SID) packets). In a persistent scheduling mode, the allocation of resources and the MCS may be valid for several packets of RT data. If the UE receives another allocation of resources, it may then override the previous allocation. In persistent scheduling, no more than four levels of MCS may be considered (as opposed to 30 levels of MCS in dynamic scheduling). Accordingly, the amount of signaling during persistent scheduling is significantly less than the amount of signaling during dynamic scheduling.

The allocation of the resources, such as downlink adaptive modulation and coding (AMC) and modulation and coding schemes, may be decided by an Evolved NodeB (eNB) depending on channel quality information (CQI) that is sent from the UE to the eNB. The CQI may be transmitted to the eNB from the UE through a dedicated UL control channel, such as a Physical Uplink Control Channel (PUCCH). In previous systems the set of bits used by the UE to insert CQI in the PUCCH is fixed in both the dynamic scheduling mode and the persistent scheduling mode. The set of bits used for CQI may be referred to as "CQI bits".

Proposals have been made to change the number of CQI bits depending on the scheduling mode (i.e., the persistent scheduling mode or the dynamic scheduling mode). For example, the CQI bits may be reduced for persistent scheduled VoIP traffic. Specifically, the CQI bits may be reduced for VoIP DL talkspurt traffic. Talkspurt traffic may indicate that the UE is in an active state and is receiving or transmitting voice packets. During a DL silence period, SID packets may be received by the UE and no CQI is transmitted. In one example, the CQI bits for persistent scheduled VoIP DL talkspurt traffic is reduced to two. As previously stated, no more than four levels of MCS may be considered in the persistent scheduling mode. As such, reducing the CQI bits to two is sufficient for persistent scheduling of resources for UEs.

Currently, three format types exist for an UL control channel that is used to carry CQI and acknowledgment/non-acknowledgment (ACK/NAK) information from the UE to the eNB. In one configuration, the UL control channel is a PUCCH. A first format (hereinafter, "format 1") and a second format (hereinafter, "format 0") are currently used to carry ACK/NAK information. A third format (hereinafter, "format 2") is currently used to carry CQI and ACK/NAK information. Format 0 may indicate that one bit is carried on the PUCCH. Format 1 may indicate that two bits are carried on the PUCCH. Format 2 may indicate that 10 bits are carried on the PUCCH to the eNB. Table 1 illustrates the current format types of the PUCCH.

TABLE 1

| Format Type | Capacity | Contents |
| --- | --- | --- |
| Format 0 | 1 bit | ACK/NAK |
| Format 1 | 2 bits | ACK/NAK |
| Format 2 | Up to 10 bits | CQI + ACK/NAK |

Since the number of CQI bits may be reduced in persistent scheduled VoIP DL talkspurt traffic, resources may be wasted if format 2 of the PUCCH is used to carry CQI. However, the introduction of a new format type for a PUCCH to transmit the reduced CQI bits for VoIP traffic may introduce several layers of complexity. As such, existing PUCCH format types can be utilized to carry CQI for VoIP traffic in LTE systems. For example, format 1 may be utilized to carry ACK/NAK information or CQI for UEs in a persistent scheduling mode. Table 2 illustrates using existing PUCCH format types to carry CQI for VoIP traffic.

TABLE 2

| Format type | Capacity | Contents |
| --- | --- | --- |
| Format 0 | 1 bit | ACK/NACK |
| Format 1 | 2 bits | ACK/NACK<br>CQI for persistent scheduling |
| Format 2 | Up to 10 bits | CQI for dynamic scheduling + ACK/NACK |

Under the 3GPP Radio Access Network (RAN) standard, there are different target quality thresholds for CQI and ACK/NAK information. Table 3, shown below, provides the target quality thresholds for uplink control signaling of various events. As shown by Table 3, the 3GPP RAN standard indicates that the ACK/NAK information has a more stringent target threshold than CQI.

TABLE 3

| Event | Target Quality Threshold |
| --- | --- |
| ACK miss detection (for DL-SCH) | (1e−2) |
| DTX to ACK error (for DL-SCH) | (1e−2) |
| NACK to ACK error (for DL-SCH) | (1e−4) |
| CQI block error rate (BER) | (1e−2~1e−1) |

If the same PUCCH format (e.g., format 1) is used to carry ACK/NAK information for some UEs and CQI for other UEs that are in the persistent scheduling mode, the same target quality threshold for both ACK/NAK information and CQI is satisfied. By achieving a target quality for CQI that is greater than the required target quality, scarce radio resources (e.g., power) may be wasted (or not fully utilized). Accordingly, in order to achieve the target quality for CQI, and not waste resources by achieving a greater than required target quality, the present systems and methods reduce the transmission power of PUCCH for optimized VoIP CQI in LTE systems. In one example, optimized VoIP indicates VoIP transmissions to/from a UE that is in a persistent scheduling mode.

Figure 1:
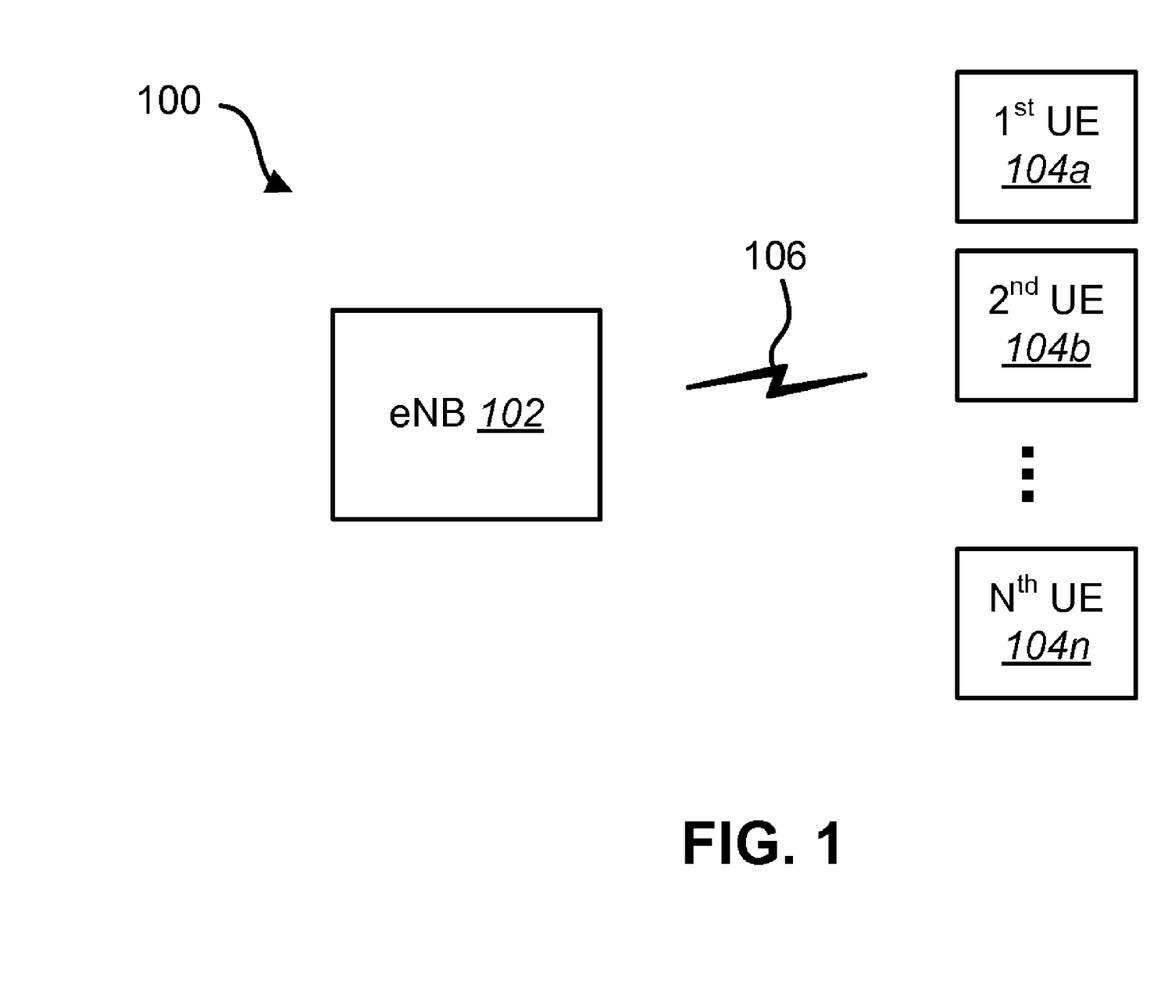
FIG. 1 illustrates a wireless communication system in which configurations of the present systems and methods may be practiced.

FIG. 1 illustrates a wireless communication system 100 in which configurations of the present systems and methods may be practiced. An Evolved NodeB (eNB) 102 may be in wireless communication with one or more pieces of mobile user equipment (UE) 104. The UE may be a mobile station, user device, communications device, subscriber unit, access terminal, terminal, cellular device, etc.

The eNB 102 may a base station, access router, base station controller, base station transceiver, etc. The eNB 102 may be a unit adapted to transmit data to and receive data from cells. In one example, the eNB 102 handles the actual communication across a radio interface, covering a specific geographical area, also referred to as a cell. Depending on sectoring, one or more cells may be served by the eNB 102, and accordingly the eNB 102 may support one or more mobile UEs 104 depending on where the UEs are located. In one configuration, the eNB 102 provides a Long Term Evolution (LTE) air interface and performs radio resource management for the communication system 100.

A first UE 104a, a second UE 104b, and an Nth UE 104n are shown in FIG. 1. The eNB 102 transmits data to the UEs 104 over a radio frequency (RF) communication channel 106. The transmitted data may include a plurality of LTE frames. Each of the LTE radio frames may have a length of 10 ms.

Figure 2:
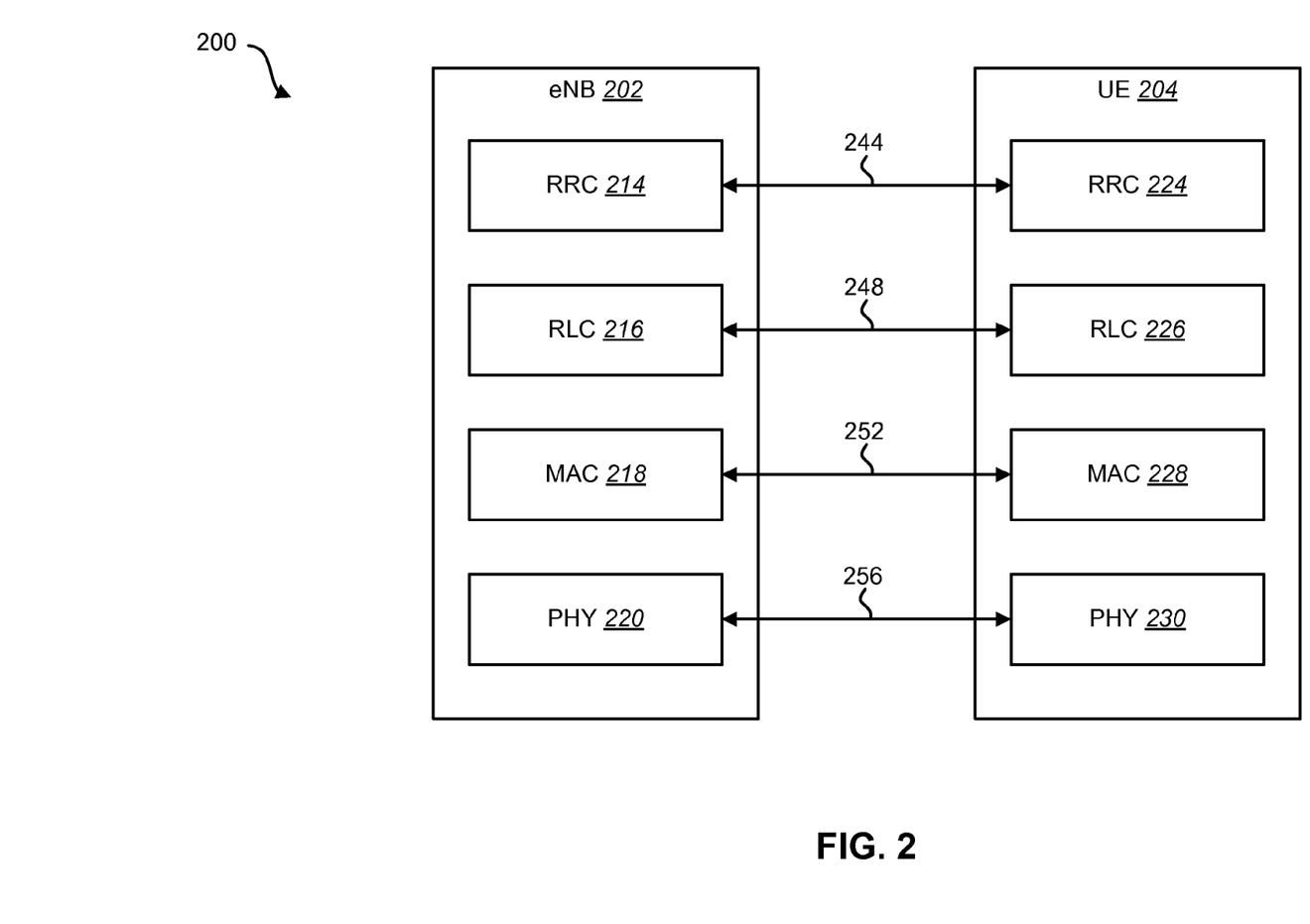
FIG. 2 is a diagram of a portion of the protocol stacks for the control plane of a mobile user equipment (UE) and an Evolved NodeB (eNB)

FIG. 2 is a diagram 200 of a portion of the protocol stacks for the control plane of a UE 204 and an eNB 202. The protocol stacks may provide radio interface architecture between the eNB 202 and the UE 204. In one configuration, the control plane includes a Layer 1 stack that includes a physical (PHY) layer 220, 230, a Layer 2 stack that includes a medium access control (MAC) layer 218, 228, and a Radio Link Control (RLC) layer 216, 226 and a Layer 3 stack that includes a Radio Resource Control (RRC) layer 214, 224.

The RRC layer 214, 224 may be a Layer 3 radio interface adapted to provide an information transfer service to a non-access stratum. The RRC layer 214, 224 of the present systems and methods may be utilized to transfer CQI and ACK/NAK information from the UE 204 to the eNB 202. The RRC layer 214, 224 may also provide RRC connection management.

The RLC layer 216, 226 may be a Layer 2 radio interface adapted to provide transparent, unacknowledged, and acknowledged data transfer service. The MAC layer 218, 228 may be a radio interface layer providing unacknowledged data transfer service on the logical channels and access to transport channels. The MAC layer 218, 228 may be adapted to provide mappings between logical channels and transport channels.

The PHY layer 220, 230 may provide information transfer services to the MAC layer 218, 228 and other higher layers 214, 216, 224, 226. The PHY layer 220, 230 transport services may be described by their manner of transport. Furthermore, the PHY layer 220, 230 may be adapted to provide multiple control channels. In one example, the UE 204 is adapted to monitor this set of control channels. Furthermore, as shown, each layer establishes a communication line 244, 248, 252, 256 with its compatible layer.

Figure 3:
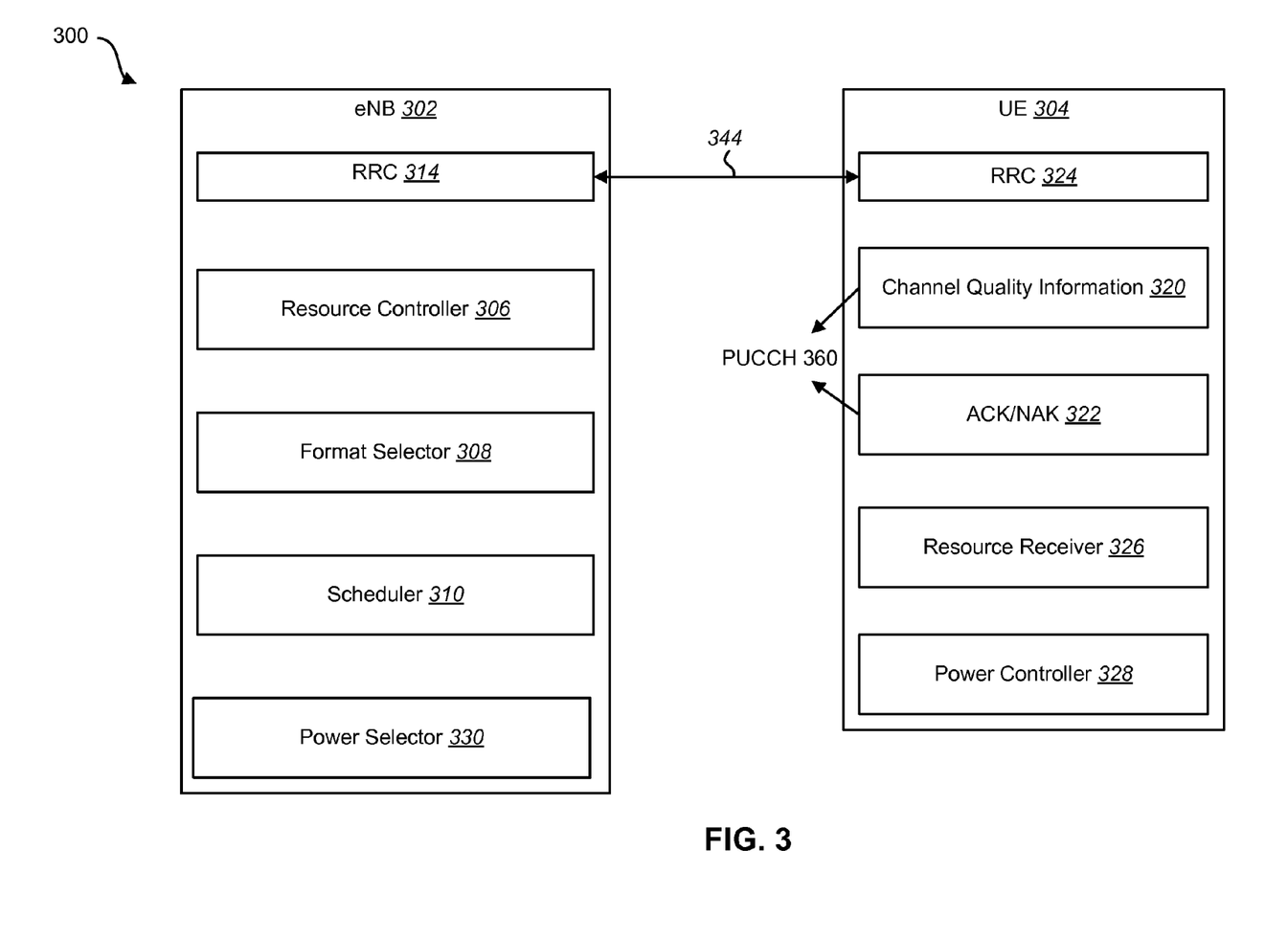
FIG. 3 is a block diagram illustrating one configuration of the eNB and the UE.

FIG. 3 is a block diagram 300 illustrating one configuration of the eNB 302 and the UE 304. The UE 304 may include an RRC layer 324 and may communicate with the eNB 302 through RRC signaling 344 with the corresponding RRC layer 314 of the eNB 302. For example, an RRC message may be transmitted from the eNB 302 to the UE 304 via RRC signaling 344. The RRC message may indicate the number of bits that should be used for CQI 320. In addition, the RRC message may indicate a power reduction amount. The power reduction amount may indicate how much the UE 304 should reduce the power used to transmit CQI 320 to the eNB 302. In one configuration, the RRC message 344 configures the future periodical CQI transmission for a certain UE until a new RRC message changes the settings.

The eNB 302 may include a resource controller 306 that allocates resources to the UE 304. The UE 304 may utilize these resources to transmit information to and receive information from the eNB 302. In one example, the resource controller 306 allocates resources for a Physical Downlink Shared Channel (PDSCH) and a Physical Uplink Shared Channel (PUSCH). In addition, the resource controller 306 may allocate resources for a Physical Hybrid Automatic Request Indicator Channel (PHICH). The PHICH may be utilized to carry ACK/NAK information on a downlink (DL) (i.e., from the eNB 302 to the UE 304). Further, the controller 306 may also allocate resources for a Physical Uplink Control Channel (PUCCH) 360. The PUCCH 360 may be utilized to carry ACK/NAK information 322 or CQI 320 from the UE 304 to the eNB 344 on an uplink (UL).

In one configuration, the allocation of resources for the PUCCH 360 may include information regarding the time and frequency associated with the PUCCH 360. The allocation of the PUCCH 360 may also include information regarding a UE index. Further, the allocation of the PUCCH 360 may indicate to the UE 304 which format type of the PUCCH 360 should be utilized to transmit information to the eNB 302. A format selector 308 may be used to select the format type of the PUCCH 360. In one example, the PUCCH 360 includes three format types (e.g., format 0, format 1 and format 2) as previously described above.

The eNB 302 may also include a scheduler 310 that schedules information received from the UE 304 into one or more subframes of the LTE radio frames. In one example, the scheduler 310 allocates different subframes for CQI 320 and ACK/NAK information 322 received from the UE 304.

In another configuration, the eNB 302 includes a power selector 330. The selector 330 may determine the power reduction amount for the UE 304. As previously explained, the power reduction amount indicates how much the UE 304 should reduce the power used to transmit CQI 320 to the eNB 302.

The UE 304 may include a resource receiver 326 that receives the allotment of resources from the eNB 302. The receiver 326 also determines which format type of the PUCCH 360 should be utilized to transmit CQI 320 or ACK/NAK information 322 to the eNB 302. Based upon the determined format type, the UE 304 transmits CQI 320 or ACK/NAK information 322 on the PUCCH 360.

The UE 304 may also include a power controller 328. The power controller 328 determines the amount of power that should be used to transmit CQI 320 on the PUCCH 360 to the eNB 302. In one example, the power controller 328 may determine that less power should be used if an RRC message with a power reduction amount has been provided to the UE 304 by the eNB 330. In another example, the power controller 328 may determine that a standard amount of less power should be used to transmit the two-bit CQI if such power reduction amount has been agreed as being standard for the use of the PUCCH 360. In the latter example, the power controller 328 may not need the power reduction amount information from the RRC message to determine the correct transmission power. In that case, the power reduction amount information may be stored in the UE 304.

Figure 4:
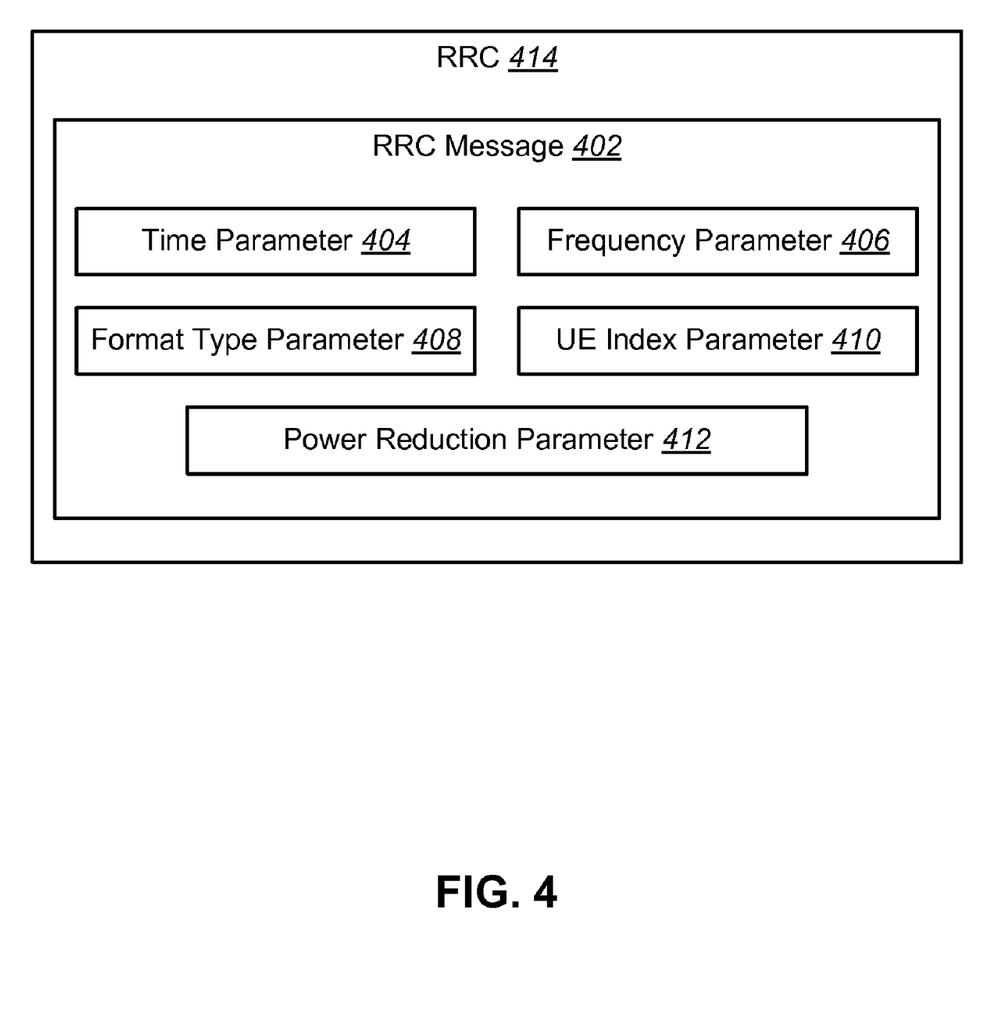
FIG. 4 is an example of a radio resource control (RRC) message that may be transmitted to a UE via RRC signaling.

FIG. 4 is an example of an RRC message 402 that may be transmitted to a UE 104. The RRC message 402 may be included in the RRC protocol layer 414 and may be transmitted to the UE 104 via RRC signaling 244. The message 402 may be used to inform the UE 104 of the resources allocated to the UE 104. The RRC message 402 may include a time parameter 404 and a frequency parameter 406 which may indicate the time and frequency associated with certain resources allotted to the UE 104 (e.g., the PUCCH 360).

The message 402 may also include a format type parameter 408 that indicates which format type of the PUCCH 360 is to be utilized by the UE 104. A UE index parameter 410 may also be included in the RRC message 402 which provides information regarding the UE index. By allocating a different time, frequency and UE index for each UE, the eNB 102 may treat the PUCCH 360 for each UE as independent.

The RRC message 402 may further include a power reduction parameter 412. The reduction parameter 412 indicates the how much the power for transmitting CQI 320 to the eNB 102 should be reduced to transmit the 2 bits of CQI. The power reduction parameter 412 may be a nonzero value if the UE is in the persistent scheduling mode and two bits are used to transmit optimized VoIP CQI 320 (i.e., format 1 of the PUCCH 360 is used). The power reduction parameter may be a fixed amount. For example, the power reduction parameter may be 4 dB which indicates that the UE 104 should reduce the power used to transmit the 2-bit CQI 320 by 4 dB from the standard transmission power amount. In another example, the power reduction parameter may not be present if the standard settings specify the power reduction amount. For example, the power reduction amount information may be pre-configured in the power controller 328 of the UE.

Figure 5:
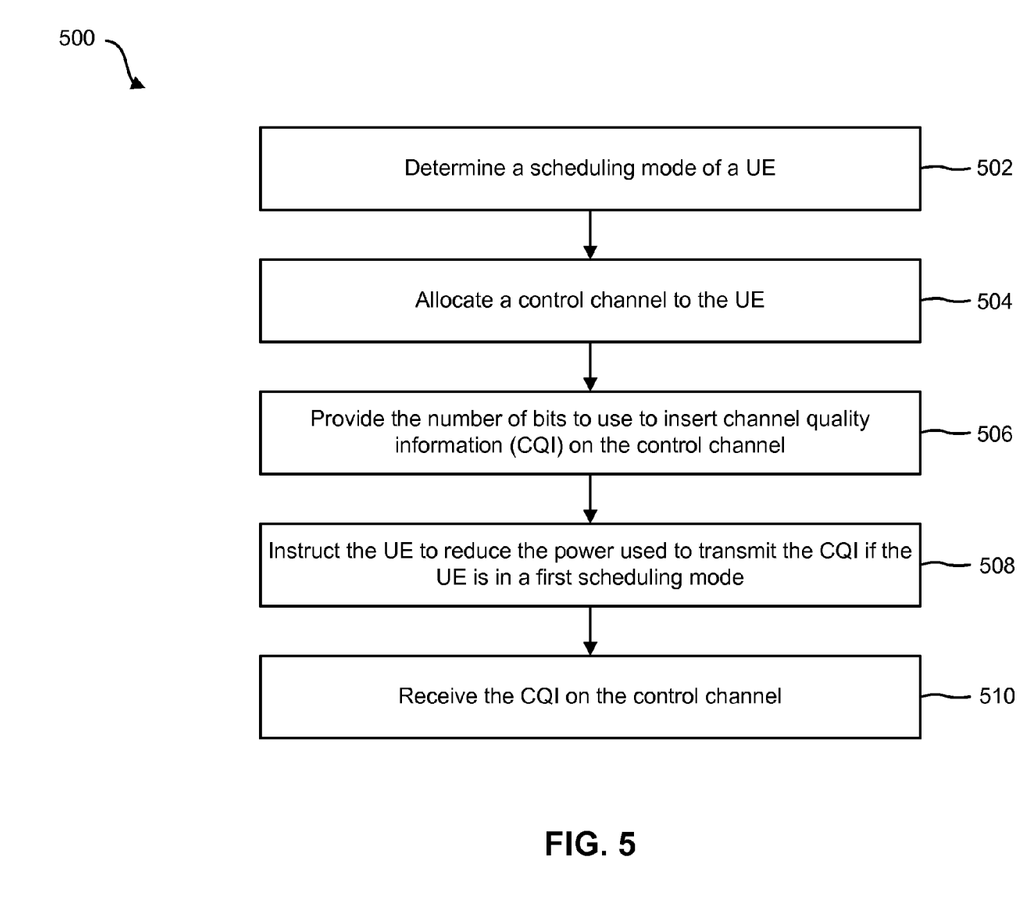
FIG. 5 is a flow diagram illustrating one example of a method for providing a power reduction amount to a UE to reduce the power used by the UE to transmit information on an uplink control channel.

FIG. 5 is a flow diagram illustrating one example of a method 500 for providing a power reduction amount to a UE 104 to reduce the power used to transmit information on an uplink control channel. The method 500 may be implemented by the eNB 102. In one configuration, a scheduling mode of a UE 104 may be determined 502. The scheduling mode may be a dynamic scheduling mode or a persistent scheduling mode as previously described.

A control channel may be allocated 504 to the UE 104. The control channel may be the PUCCH 360. In addition, the number of bits to use to insert CQI 320 on the control channel is provided 506 to the UE 104. The RRC message 402 may be utilized to provide 506 the number of bits to use for the CQI 320. For example, if the UE 104 is in a dynamic scheduling mode, the number of bits to use to insert CQI 320 on the PUCCH 360 may be five. If the UE is in a persistent scheduling mode, the number of bits may be reduced to two.

In one configuration, if the UE is in a first scheduling mode, the UE 104 is instructed 508 to reduce the power used to transmit the CQI 320. The first scheduling mode may be the persistent scheduling mode. The RRC message 402 may be used to instruct 508 the UE to reduce the amount of power used to transmit the CQI 320. The CQI 320 may be received 510 on the control channel.

By reducing the power used to transmit optimized CQI on the PUCCH 360, the target quality thresholds specified in 3GPP for CQI and ACK/NAK information (see Table 3) may be satisfied. In addition, the transmission power consumption of a UE in a persistent scheduled mode transmitting VoIP will be reduced. Further, the interference level for PUCCH 360 may also be reduced which improves the control information bit to error rate (BER) in the LTE system. The robustness of the PUCCH 360 in the LTE system may also be improved.

Figure 6:
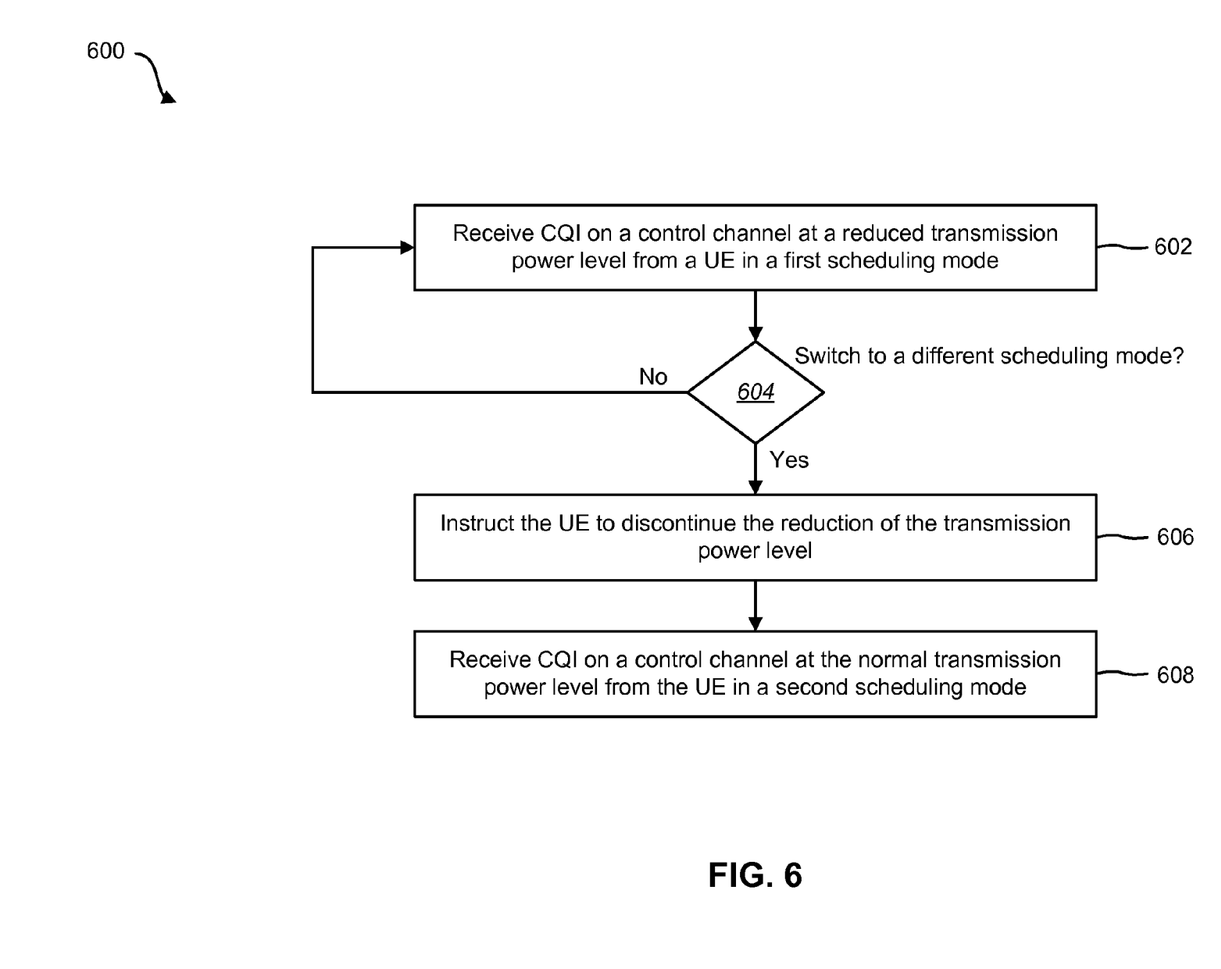
FIG. 6 is a flow diagram illustrating one example of a method for discontinuing a reduction of the power used to transmit channel quality information (CQI) on an uplink (UL) control channel.

FIG. 6 is a flow diagram illustrating one example of a method 600 for discontinuing a reduction of the power used to transmit CQI on a UL control channel, such as the PUCCH 360. The method 600 may be implemented by the eNB 102. In one configuration, CQI 320 may be received 602 on a UL control channel. The CQI 302 may be received 602 at a reduced transmission power level from a UE in a first scheduling mode. The first scheduling mode may be the persistent scheduling mode as previously explained.

A determination 604 may be made as to whether there is a need to change the scheduling mode. One example of need to change the scheduling mode is that there is a new downlink application added which alters the downlink packet traffic pattern from periodical traffic to bursty traffic. In this example, the eNB 102 desires to change the persistent scheduling mode to dynamic scheduling mode. The UE 104 may be instructed 606 to discontinue the reduction of the transmission power level. In one example, an increased number of bits may be used to insert CQI 320 on the control channel. The increased number of bits used for CQI 320 may be received 608 on the control channel. The CQI 320 with the increased number of bits may be received 608 at the normal (i.e., standard) transmission power level from the UE. The UE may be in a second scheduling mode (e.g., the dynamic scheduling mode). The UE 104 may be instructed 606 by instructions carried in the RRC signaling message 414.

Figure 7:
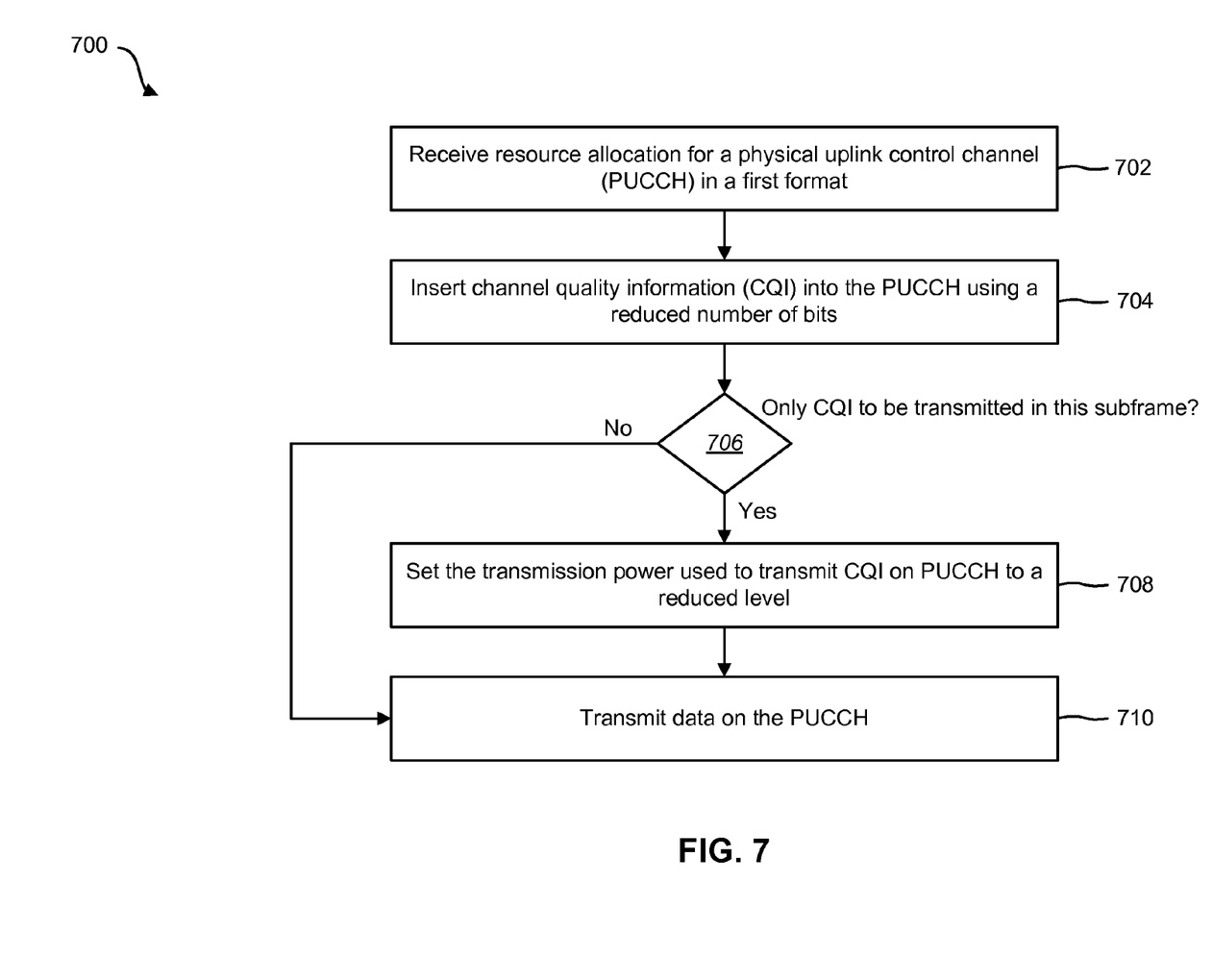
FIG. 7 is a flow diagram illustrating one example of a method for reducing the power used to transmit CQI on a control channel.

FIG. 7 is a flow diagram illustrating one example of a method 700 for reducing the transmission power used to transmit CQI 320 on a control channel. The method 700 may be implemented by the UE 104. In one example, an allocation of resources for a PUCCH 360 may be received 702. The allocation may indicate that the PUCCH 360 is in a first format (i.e., format 1). The UE 104 may be in the persistent scheduling mode. The CQI 320 may be inserted 704 into the PUCCH 360 using a reduced number of bits. In one example, the number of bits for the CQI 320 is reduced from five to two.

A determination 706 may be made as to whether or not only CQI 320 is to be transmitted in a subframe. If CQI 320 is not the only data to be transmitted in the subframe, data (including CQI 320) may be transmitted 710 on the PUCCH 360. However, if CQI 320 the only data transmitted in the subframe, the transmission power used to transmit CQI 320 on the PUCCH 360 may be set 708 to a reduced level. The data (i.e., CQI 320) may be transmitted 710 on the PUCCH.

In one example, an RRC message 402 is received indicating how much to reduce the power. The CQI 320 may be transmitted 710 on the PUCCH 360 using the reduced transmission power. When there is other up link data or control signals other than CQI to be transmitted in the same subframe, such power reduction of CQI transmission may need to be temporarily suspended in the subframe. In that case, the determination 706 may be made as to whether or not the subframe only has a reduced bit CQI to transmit.

Figure 8:
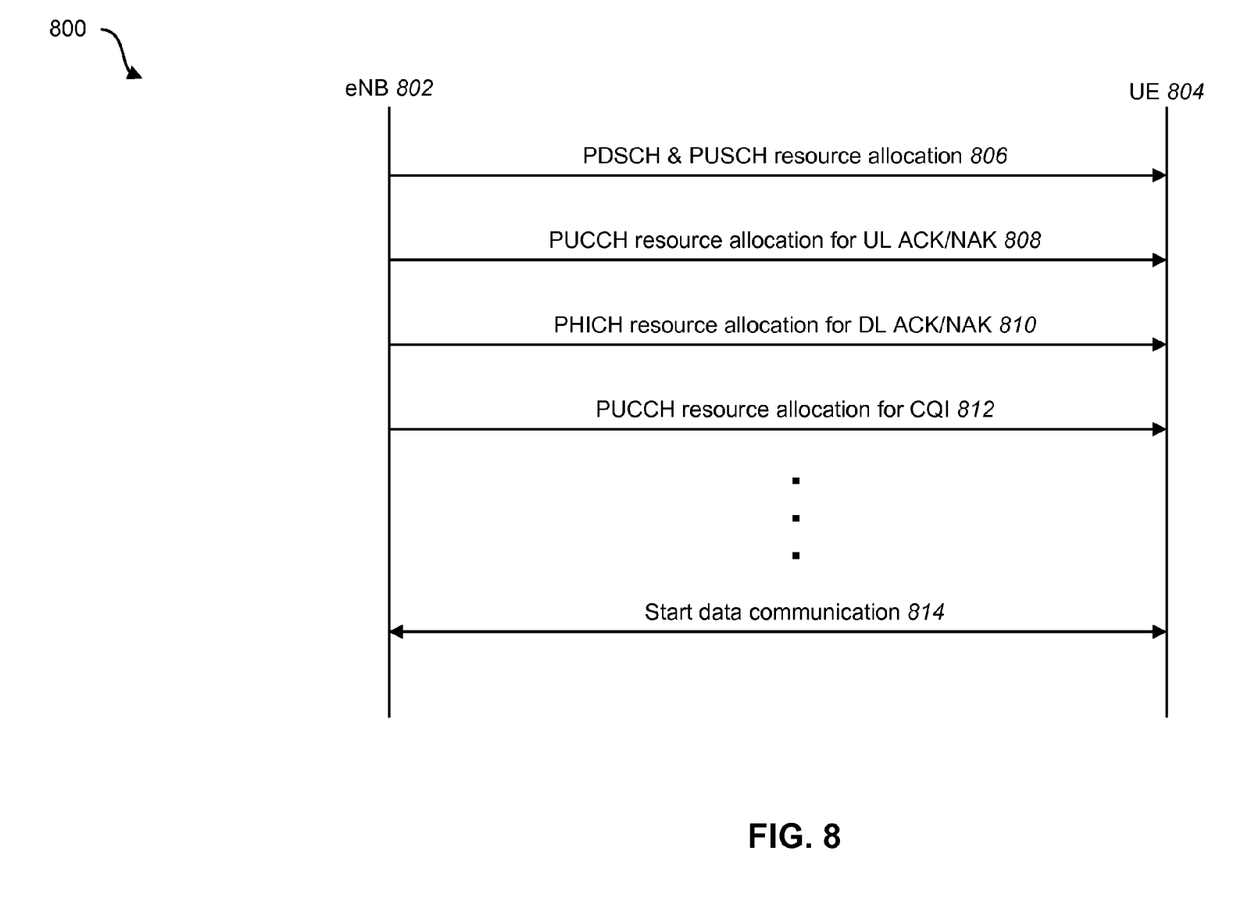
FIG. 8 is a thread diagram illustrating one configuration of persistent scheduling communication in accordance with the present systems and methods.

FIG. 8 is a thread diagram 800 illustrating one configuration of persistent scheduling communication in accordance with the present systems and methods. In one example, before data communication is started 814, the eNB 802 informs the allocation of resources to the UE 804 with an RRC message 402 via RRC signaling 344. For example, the resources for the PDSCH and the PUSCH may be allocated 806 to the UE 804. In addition, the resources for UL ACK/NAK on the PUCCH may also be allocated 808. The eNB 802 may further allocate 810 resources for DL ACK/NAK. The DL ACK/NAK may be carried on the PHICH.

Further, the RRC message 402 may indicate the allocation 812 of resources for CQI 320 that is carried on the PUCCH 360. For example, the RRC message 402 may indicate that two bits are to be used for CQI 320 on the PUCCH 360. The RRC message 402 may also inform the UE 804 that the power used to transmit CQI 320 is to be reduced by a certain amount. The reduction amount of the power may be a fixed amount. This amount may be derived from link level simulations of different scenarios. For example, by loosening the target quality of CQI 320 from 10e-4 to 10e-2, the signal-to-noise ratio (SNR) for transmission of the PUCCH 360 in format 1 may be reduced up to 8 dB.

If there is to be one fixed amount power reduction parameter needed, a reduction amount may be chosen from the link level simulation results with a safety margin to cover most or all of the cases. In such a case, a single power reduction parameter exists for each UE in the entire network. In another configuration, dynamic adaptive reduction based on the speed of the UE 804, channel condition, etc. may be used to determine the reduction amount of the transmission power for CQI 320. In the latter case, the reduction amount of the power for CQI transmissions can differ.

Additional resources may be allocated that are not shown in FIG. 8. Once the resources have been allocated, data communications may start 814 between the eNB 802 to the UE 804. The UE 804 may be a persistent scheduled UE.

As shown in FIG. 8, the eNB 802 may provide the resource allocation parameters for the PUCCH 360 to each persistent scheduled UE. However, for dynamic scheduling, the eNB 802 may reserve a set of allocation parameters for dynamic scheduled UEs. Otherwise, resources for a dynamic scheduled UE and a persistent scheduled UE may conflict.

Figure 9:
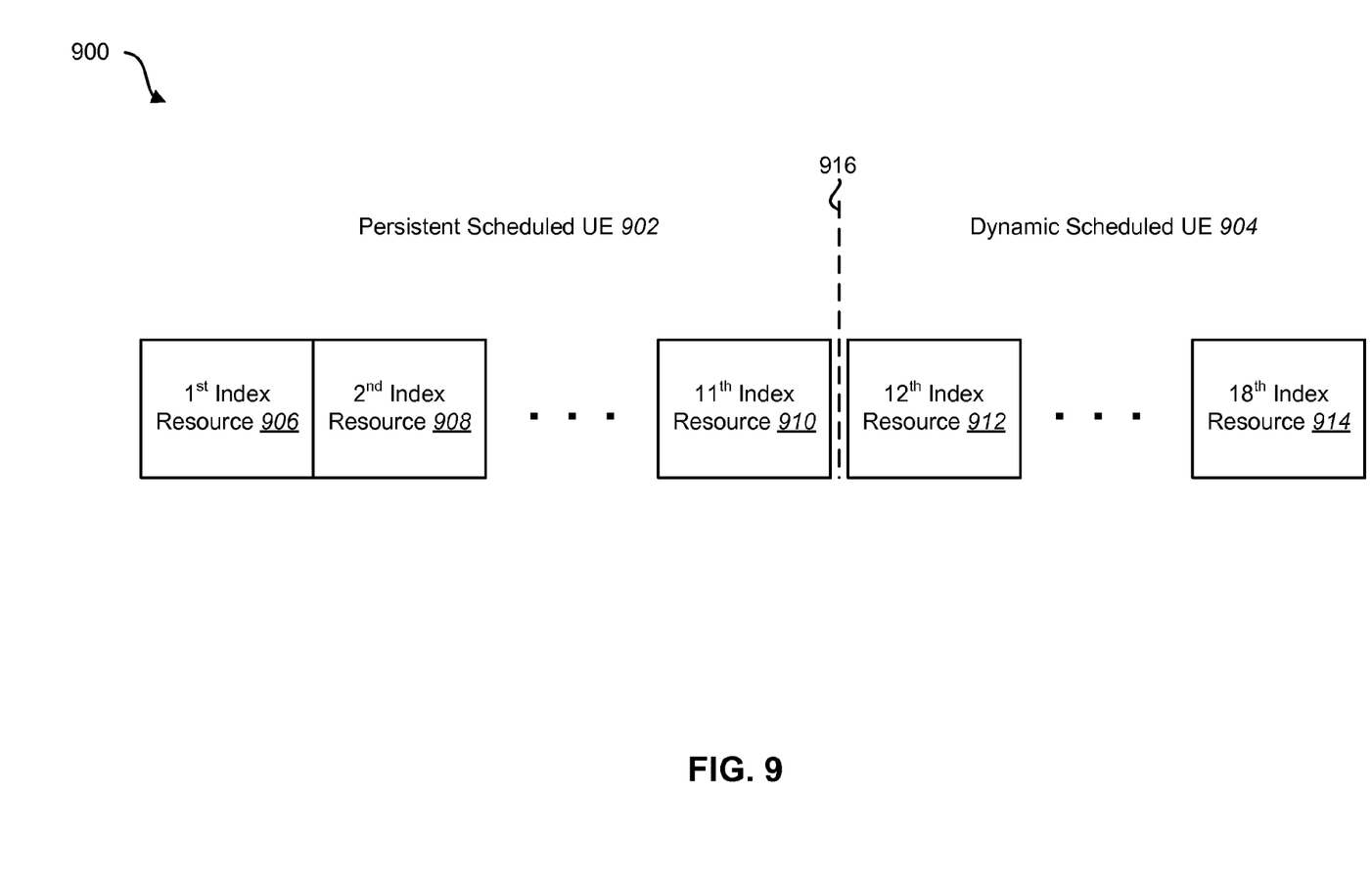
FIG. 9 illustrates one example of a process of reserving resource allocations for a persistent scheduled UE and a dynamic scheduled UE.

FIG. 9 illustrates one example of a process 900 of reserving resource allocations for a persistent scheduled UE 902 and a dynamic scheduled UE 904. A resource separation 916 illustrates the separate reservation of resource allocations for the UEs 902, 904. In one configuration, for the persistent scheduled UE 902, the resources for CQI 320 and ACK/NAK information 322 are reserved. For example, this reservation may include a $1^{st}$ index resource 906, a $2^{nd}$ index resource 908, up to an $11^{th}$ index resource 910. For the dynamic scheduled UE 904, the resource for the ACK/NAK information 322 may be reserved separately. These resources may include the $12^{th}$ index resource 912 up to the 18th index resource 914.

By reserving the resources separately, a conflict is avoided for resources relating to ACK/NAK information 322 for dynamic scheduled UEs 904, ACK/NAK information 322 for persistent scheduled UEs 902 and CQI 320 for persistent scheduled UEs 320. Both the eNB and each UE are aware of which resources are allocated to each UE.

In some configurations, during VoIP conversations, CQI 320 and ACK/NAK information 322 for a persistent scheduled UE may be transmitted in the same subframe. However, a different UE index may be allocated to CQI 320 and the ACK/NAK information 322. As such, there may not be a conflict of resources if CQI 320 and the ACK/NAK information 322 are transmitted in the same subframe. But, in some examples, the UE 104 may be on the cell edge and the eNB 102 may allocate more transmission power to these signals. In this configuration, CQI 320 and the ACK/NAK information 322 may be allocated in different subframes.

The eNB scheduler 310 may allocate different subframes for CQI 320 and ACK/NAK information 322. In VoIP, the timing of persistent scheduled data (e.g., new data) and dynamic scheduled data (e.g., retransmission data) may be predetermined by the scheduler 310. As such, the eNB scheduler 310 may allocate different subframes for CQI 320 and ACK/NAK information 322 that is transmitted from the same UE.

Figure 10:
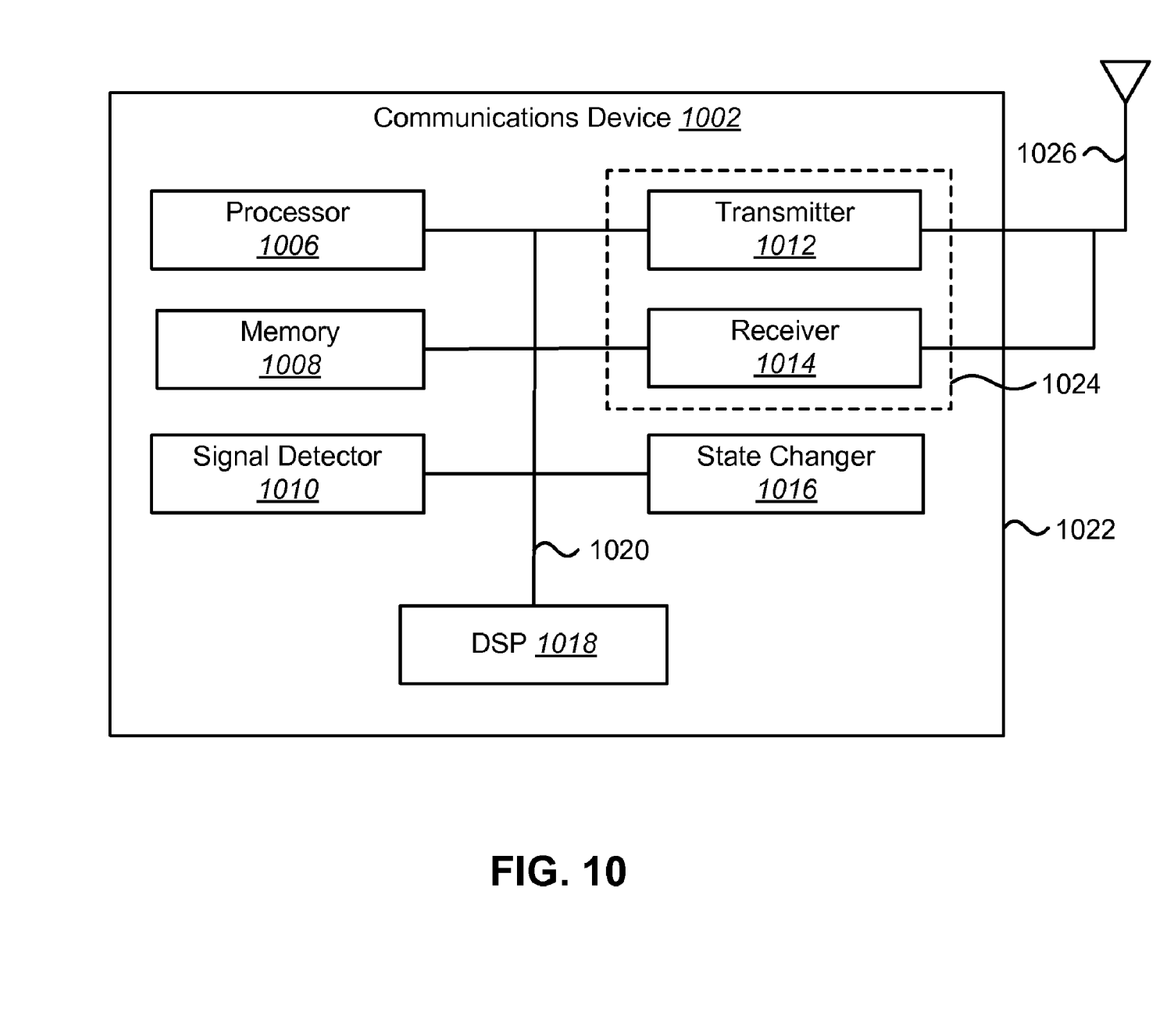
FIG. 10 illustrates various components that may be utilized in a communications device.

FIG. 10 illustrates various components that may be utilized in a communications device 1002. One or more communications devices 1002 may be used to implement the various systems and methods disclosed herein. The communications device 1002 may be the UE 104, a mobile node, a cellular device, an access terminal, and any variation or related device thereof. The illustrated components may be located within the same physical structure or in separate housings or structures. The device 1002 includes a processor 1006 which controls operation of the device 1002. The processor 1006 may also be referred to as a CPU.

Memory 1008, which may include both read-only memory (ROM) and random access memory (RAM), provides instructions and data to the processor 1006. A portion of the memory 1008 may also include non-volatile random access memory (NVRAM). The memory 1008 may include any electronic component capable of storing electronic information, and may be embodied as ROM, RAM, magnetic disk storage media, optical storage media, flash memory, on-board memory included with the processor 1006, EPROM memory, EEPROM memory, registers, a hard disk, a removable disk, a CD-ROM, etc. The memory 1008 may store program instructions and other types of data. The program instructions may be executed by the processor 1006 to implement some or all of the methods disclosed herein.

The device 1002 may also include a housing 1022 that includes a transmitter 1012 and a receiver 1014 to allow transmission and reception of data between the communications device 1002 and a remote location. The transmitter 1012 and receiver 1014 may be combined into a transceiver 1024. An antenna 1026 is attached to the housing 1022 and electrically coupled to the transceiver 1024.

The communications device 1002 also includes a signal detector 1010 used to detect and quantify the level of signals received by the transceiver 1024. The signal detector 1010 detects such signals as total energy, power spectral density and other signals.

A state changer 1016 of the device 1002 controls the state of the device 1002 based on a current state and additional signals received by the transceiver 1024 and detected by the signal detector 1010. The device 1002 is capable of operating in any one of a number of states.

The various components of the device 1002 are coupled together by a bus system 1020 which may include a power bus, a control signal bus, and a status signal bus in addition to a data bus. However, for the sake of clarity, the various busses are illustrated in FIG. 10 as the bus system 1020. The device 1002 may also include a digital signal processor (DSP) 1018 for use in processing signals.

Figure 11:
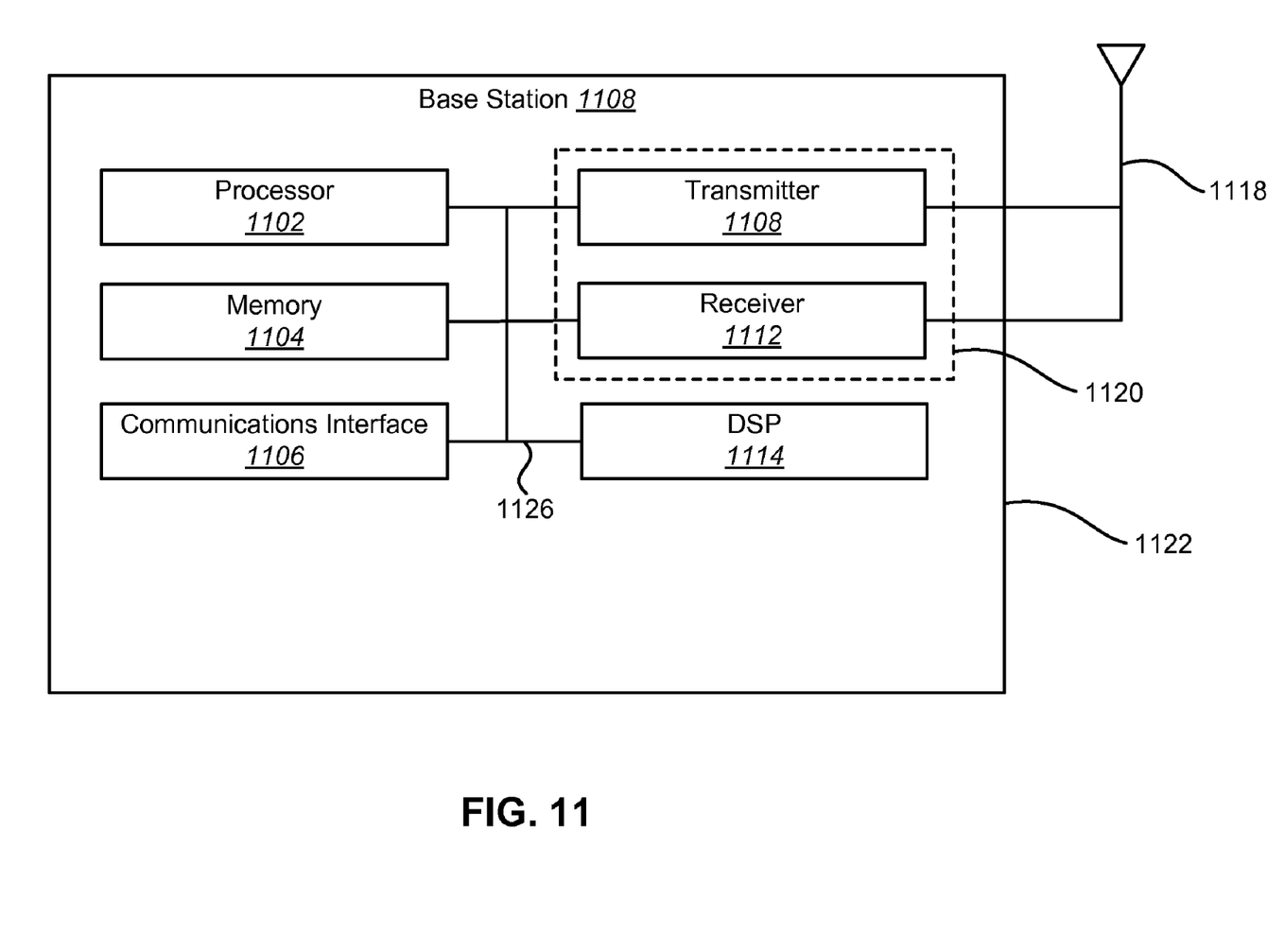
FIG. 11 is a block diagram of a base station in accordance with one configuration of the disclosed systems and methods.

FIG. 11 is a block diagram of a base station 1108 in accordance with one configuration of the disclosed systems and methods. The base station 1108 may be the eNB 102, a base station controller, a base station transceiver, etc. The base station 1108 includes a transceiver 1120 that includes a transmitter 1110 and a receiver 1112. The transceiver 1120 may be coupled to an antenna 1118. The base station 1108 further includes a digital signal processor (DSP) 1114, a general purpose processor 1102, memory 1104, and a communication interface 1106. The various components of the base station 1108 may be included within a housing 1122.

The processor 1102 may control operation of the base station 1108. The processor 1102 may also be referred to as a CPU. The memory 1104, which may include both read-only memory (ROM) and random access memory (RAM), provides instructions and data to the processor 1102. A portion of the memory 1104 may also include non-volatile random access memory (NVRAM). The memory 1104 may include any electronic component capable of storing electronic information, and may be embodied as ROM, RAM, magnetic disk storage media, optical storage media, flash memory, on-board memory included with the processor 1102, EPROM memory, EEPROM memory, registers, a hard disk, a removable disk, a CD-ROM, etc. The memory 1104 may store program instructions and other types of data. The program instructions may be executed by the processor 1102 to implement some or all of the methods disclosed herein.

In accordance with the disclosed systems and methods, the antenna 1118 may receive reverse link signals that have been transmitted from a nearby communications device 1002, such as the UE 104. The antenna 1118 provides these received signals to the transceiver 1120 which filters and amplifies the signals. The signals are provided from the transceiver 1120 to the DSP 1114 and to the general purpose processor 1102 for demodulation, decoding, further filtering, etc.

The various components of the base station 1108 are coupled together by a bus system 1126 which may include a power bus, a control signal bus, and a status signal bus in addition to a data bus. However, for the sake of clarity, the various busses are illustrated in FIG. 11 as the bus system 1126.

The present systems and methods described herein relate to 3GPP LTE systems. However, the present systems and methods may be utilized for other OFDM communication systems, for example IEEE 802.16m.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for instructing a mobile node to reduce the power used to transmit channel quality information, comprising:
    determining a scheduling mode of the mobile node;
    allocating an uplink control channel in a first format to the mobile node when the mobile node is in a first scheduling mode, wherein the uplink control channel is a Physical Uplink Control Channel (PUCCH), and wherein the uplink control channel in the first format carries two bits of information;
    providing a number of bits to use to insert channel quality information (CQI) on the uplink control channel; and
    instructing the mobile node to reduce the power used to transmit the CQI by a power reduction amount when the mobile node is in the first scheduling mode.

2. The method of claim 1, wherein the CQI comprises two bits.

3. The method of claim 1, wherein the number of bits is provided by a radio resource control (RRC) message via RRC signaling.

4. The method of claim 1, wherein the mobile node is instructed to reduce the power used to transmit the CQI by an RRC message via RRC signaling.

5. The method of claim 1, wherein the first scheduling mode is a persistent scheduling mode.

6. The method of claim 1, further comprising instructing the mobile node to discontinue the reduction of power when the scheduling mode changes.

7. The method of claim 1, wherein the power reduction amount is a fixed amount.

8. The method of claim 1, wherein the method is implemented by a base station.

9. A method for reducing the power to transmit channel quality information, comprising:
    receiving resource allocations for an uplink control channel in a first format, wherein the uplink control channel is a Physical Uplink Control Channel (PUCCH), and wherein the uplink control channel in the first format carries two bits of information;
    inserting channel quality information (CQI) into the uplink control channel using a certain number of bits in accordance with the first format;
    reducing the power used to transmit the CQI by a power reduction amount on the uplink control channel; and
    transmitting the CQI on the uplink control channel using power that has been reduced by the power reduction amount.

10. The method of claim 9, wherein the CQI comprises two bits.

11. The method of claim 9, wherein the power reduction amount is a fixed amount.

12. The method of claim 9, wherein the method is implemented by a mobile node.

13. The method of claim 9, further comprising suspending the reduction of transmission power for the CQI when there is data or other control signaling to be transmitted in the same subframe.

14. A base station that is configured to instruct a mobile node to reduce the power used to transmit channel quality information, the base station comprising:
    a processor;
    a memory in electronic communication with the processor;
    instructions stored in the memory, the instructions being executable to:
        determine a scheduling mode of the mobile node;
        allocate an uplink control channel in a first format to the mobile node when the mobile node is in a first scheduling mode, wherein the uplink control channel is a Physical Uplink Control Channel (PUCCH), and wherein the uplink control channel in the first format carries two bits of information;
        provide a number of bits to use to insert channel quality information (CQI) on the uplink control channel; and
        instruct the mobile node to reduce the power used to transmit the CQI by a power reduction amount when the mobile node is in the first scheduling mode.

15. The base station of claim 14, wherein the CQI comprises two bits.

16. The base station of claim 14, wherein the number of bits is provided by a radio resource control (RRC) message via RRC signaling.

17. The base station of claim 14, wherein the mobile node is instructed to reduce the power used to transmit the CQI by an RRC message via RRC signaling.

18. The base station of claim 14, wherein the first scheduling mode is a persistent scheduling mode.

19. The base station of claim 14, wherein the power reduction amount is a fixed amount.

20. A non-transitory computer-readable medium comprising executable instructions for:
    determining a scheduling mode of a mobile node;
    allocating an uplink control channel in a first format to the mobile node when the mobile node is in a first scheduling mode, wherein the uplink control channel is a Physical Uplink Control Channel (PUCCH), and wherein the uplink control channel in the first format carries two bits of information;
    providing a number of bits to use to insert channel quality information (CQI) on the uplink control channel; and
    instructing the mobile node to reduce the power used to transmit the CQI by a power reduction amount when the mobile node is in the first scheduling mode.

21. A communications device that is configured to reduce the power to transmit channel quality information, the communications device comprising:
    a processor;
    a memory in electronic communication with the processor;
    instructions stored in the memory, the instructions being executable to:
        receive resource allocations for an uplink control channel in a first format, wherein the uplink control channel is a Physical Uplink Control Channel (PUCCH), and wherein the uplink control channel in the first format carries two bits of information;

insert channel quality information (CQI) into the uplink control channel using a certain number of bits in accordance with the first format;
reduce the power used to transmit the CQI by a power reduction amount on the uplink control channel; and
transmit the CQI on the uplink control channel using power that has been reduced by the power reduction amount.

* * * * *